United States Patent [19]

McMackin

[11] 4,050,404
[45] Sept. 27, 1977

[54] SURVEY MARKER

[76] Inventor: Edwin E. McMackin, 131 Yorktown, Dallas, Tex. 75208

[21] Appl. No.: 666,759

[22] Filed: Mar. 15, 1976

Related U.S. Application Data

[63] Continuation of Ser. No. 554,188, Feb. 28, 1975, abandoned.

[51] Int. Cl.² ............................................. G01C 15/06
[52] U.S. Cl. .................................... 116/124 R; 52/103
[58] Field of Search ............... 116/124 R, 173, 114 R; 52/103, 104; 40/145 A, 145 R, 10 C, 125 A, 125 H; 46/157; 156/DIG. 6, DIG. 26, 216, 212, 296

[56] References Cited

U.S. PATENT DOCUMENTS

| 1,676,927 | 7/1928 | Richard | 40/10 C |
|---|---|---|---|
| 1,984,395 | 12/1934 | Choate | 40/10 C |
| 2,632,269 | 3/1953 | Sanders | 116/173 |
| 2,660,822 | 12/1953 | Hargus | 52/103 |

Primary Examiner—S. Clement Swisher
Assistant Examiner—Denis E. Corr
Attorney, Agent, or Firm—Peter J. Murphy

[57] ABSTRACT

An elongated, small diameter metal rod, sufficiently stiff to be driven into the ground, has an indicia receiving member fixed at one end. The indicia member consists of two pliable sheets, each having adhesive on one side, bonded to each other and to the rod to provide a laminated fairly firm indicia receiving member. In an alternative version, an additional identifying or locating component is an elongated ribbon passing between the laminations of the indicia receiving member and bonded thereto, and extending beyond the edges of the indicia member.

8 Claims, 3 Drawing Figures

SURVEY MARKER

REFERENCE TO RELATED APPLICATION

This application is a continuation of application Ser. No. 554,188, filed Feb. 28, 1975, now abandoned.

BACKGROUND AND SUMMARY OF THE INVENTION

This invention relates to a survey marker capable of being driven into the ground and of carrying written indicia.

The survey marker of this invention is adapted to replace markers in the form of wood laths, which may have a typical cross-sectional dimension of 2 inches by ½ inch and may be of suitable length with a pointed or sharpened end to be driven into the ground. Such laths of course are capable of receiving written indicia. The use of wooden laths presents several disadvantages. One disadvantage is that the laths are inherently bulky occupying considerable space for storage, and in vehicles used to transport the laths from the storage point to the ultimate use point. The bulkiness may be particularly inconvenient where it is necessary for a survey crew to carry a number of survey markers in the field. Other disadvantages in connection with the use of wood laths are the difficulty of driving such laths into ground which is particularly hard, and the difficulty of attaching colored identifying flags or ribbon in a manner that these ribbons will remain attached to the stake for the desired length of time.

An object of this invention is to provide a survey marker of minimum bulk.

Another object of this invention is to provide a survey marker stake which is easily driven into the ground.

A further object of this invention is to provide a wire survey marker stake capable of receiving written indicia.

Still another object of this invention is to provide a survey marker which may be delivered to the user in kit form and is readily assembled in the field.

These objects are accomplished in a marker comprising a stake formed from an elongated small gauge metal rod, having a sufficient thickness to be driven into the ground; and an indicia member attached to said stake which consists of a laminate of two pliant sheets, each sheet initially having an adhesive coating on one face, with its other face adapted to receive written indicia. The two pliant sheets are bonded to each other and to the rod, adjacent to one end of the rod, by means of the adhesive coating. The rod is disposed between the bonded sheets, generally centrally of the opposite edges of the bonded sheets. The laminated indicia member provides a relatively firm surface capable of receiving written indicia. More specifically, the indicia member may be fabricated from a single elongated pliant sheet folded over itself and over the rod at one end thereof to define the laminated indicia member. Still more specifically, the survey marker may include an additional elongated ribbon, secured between the bonded pliant sheets, and extending transversely beyond at least one edge of the laminated indicia member to serve as an attention getting or identifying component.

The novel features and the advantages of the invention, as well as additional objects thereof, will be understood more fully from the following description when read in connection with the accompanying drawings.

DRAWINGS

DESCRIPTION OF THE PREFERRED EMBODIMENTS

Figures 1, 2, 3:
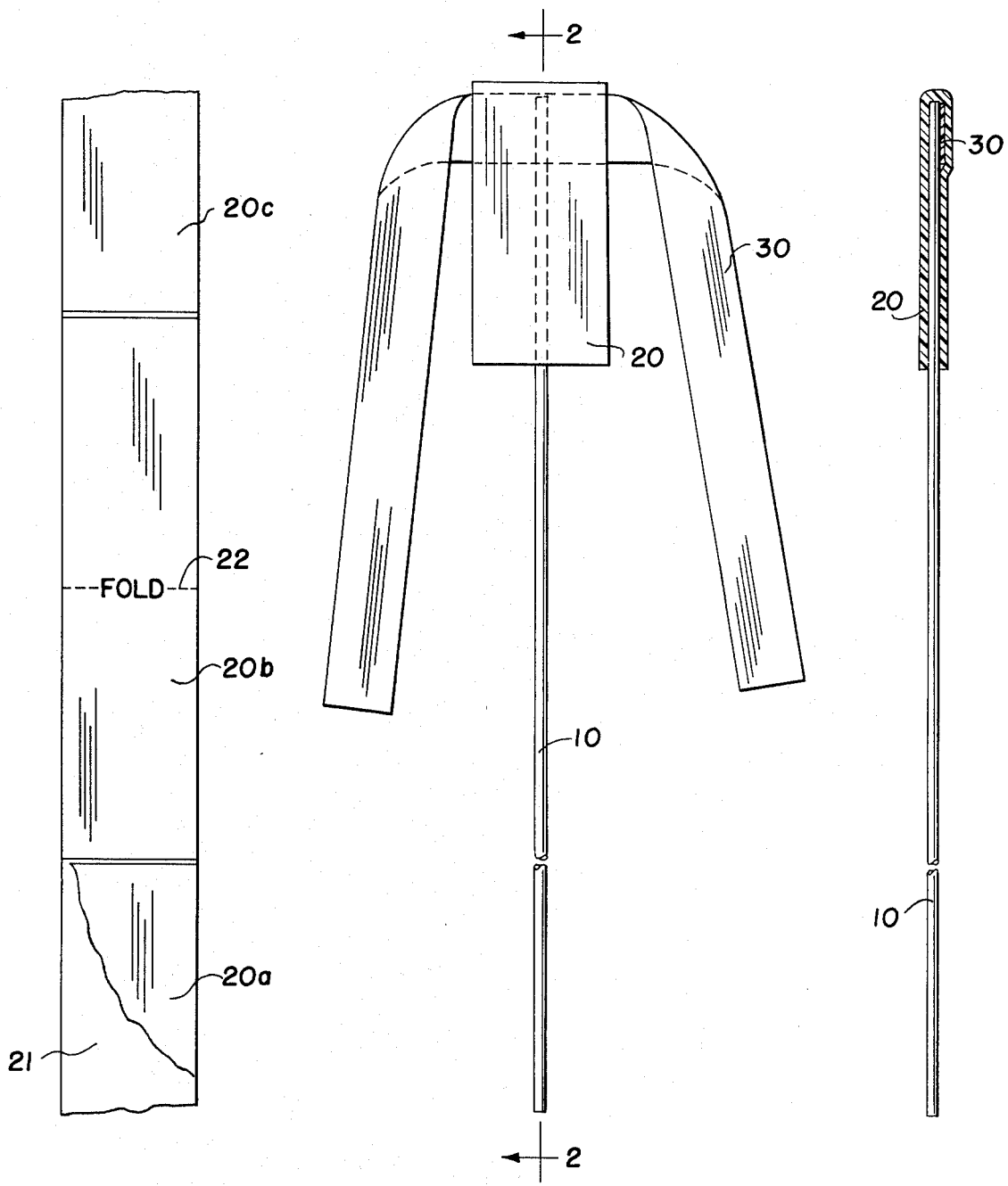
FIG. 1 is an elevation view of an assembled wire marker according to the invention.
FIG. 2 is an elevation view of the marker taken in the plane 2—2 of FIG. 1.
FIG. 3 is a fragmentary view of a strip of tape, suitable to be produced in a roll, and carrying pre-separated fabric strip components for the assembly of FIGS. 1 and 2.

Referring to the drawings, a basic form of survey marker assembly is made up of only two of the illustrated components, namely a rod 10 and an indicia member 20, the rod defining a stake portion capable of being driven into the ground and the indicia member comprising laminated "pliant sheets" providing a relatively firm surface capable of receiving written indicia.

The term "pliant sheet" as used herein, identifies pliant or pliable sheet materials including, for example: woven cloth fabric, plastic impregnated cloth fabric, plastic film such as vinyl film or polyethylene film, and other materials having similar characteristics and which are suitable for the intended purpose. Such pliant sheets, when laminated as described herein, would present a generally planar member of sufficient stiffness or firmness to provide a relatively firm surface capable of receiving written indicia, as described.

The terms "indicia" or "written indicia" as used herein include any form of information which may be placed on the indicia receiving member 20, such as information written or marked thereon with a felt tip marking pen for example.

By way of example, a rod 10 may be fabricated from steel wire, or of a gauge ranging from 14 gauge to 10 gauge, and will be sufficiently stiff to be driven into hard ground. Typical lengths of the rod 10 are from 18 to 42 inches.

A preferred form of indicia member 20 consists, for example, of an elongated pliant sheet having a prefolded dimension of 8 inches by 2 inches or 8 inches by 3 inches. One surface of this unfolded pliant sheet is capable of receiving written indicia and the other surface is adapted to receive an adhesive. For assemblying the pliant sheet to the rod the entire surface of the adhesive side of the pliant sheet is coated with an adhesive, preferably a pressure sensitive adhesive; and this sheet is folded over itself about a transverse center line and over the rod to bring the adhesive surfaces into bonding relation with each other and with the rod. The rod is substantially centered between the side edges of the strip to coincide with its longitudinal axis. The indicia receiving member 20 then consists of a laminate of two pliant sheets, to present a relatively stiff or firm generally planar member capable of receiving written indicia on both sides. Each indicia receiving face then is 2 inches by 4 inches or 3 inches by 4 inches for example. When assembled in this manner, the indicia receiving member is very firmly secured to the rod to provide the permanence needed for markers of this type.

The material used for these pliant sheets is preferably colored, and may be of different colors, so that color identification for different survey markers may be used in the field.

FIGS. 1 and 2 of the drawing illustrate a three-component form of survey marker, according to the invention, wherein a flag ribbon 30 is added to the above described assembly. This flag ribbon 30 is a strip of elongated ribbon of suitable material and color, which is secured between the two layers of the indicia member 20 adjacent to the fold line, and therefore adjacent to the top of the rod 10. This ribbon may be 1 inch in width and of substantial length such as 18 inches, is secured to the indicia marker approximately at its center and extends laterally many inches beyond the side edges of the fabric strip 20. The ribbon then is securely retained by the adhesive of the pliant sheets, and the ribbon does not interfere with the basic integrity of the assembly as both sheets of the laminate will be secured to the ribbon by means of the adhesive. The flag ribbons 30 may be of appropriate colors, and may be used simply for the purpose of assisting in locating the position of a survey marker from a distance, or for identifying or distinguishing one survey marker from adjacent survey markers.

While a preferred form of indicia member 20 consists of the described elongated single pliant sheet, symmetric about a transverse fold line and folded on itself to provide the laminated member, it will be apparent that the laminated member may be fabricated from two individual adhesive coated pliant sheets of corresponding size. Such sheets may be of any suitable size or shape and would be bonded to the rod at one end, in any desired orientation relative to the rod, and with the rod generally bisecting the laminated indicia member.

Also the flag ribbon 30, in alternative form, may traverse the indicia member in any desired orientation and at any desired location, and may extend from only one edge of the indicia member.

For the convenience of storage and use, particularly for the making up of various color combinations of indicia members and flag ribbons in the field, it is convenient to market the markers of the invention in kit form, that is with the rod, the fabric, and the ribbon components being supplied unassembled.

FIG. 3 illustrates a preferred form of pliant sheet, which may be conveniently made up in a continuous tape roll of 2 inch or 3 inch width for example. The continuous tape illustrated in FIG. 3 may consist of a continuous strip 21 of suitable paper or plastic which serves as a backing strip for pre-separated lengths of pliant sheets, such as the elongated strips designated 20a, 20b and 20c in FIG. 3. The fabric strips may be conveniently fabricated with a pressure sensitive adhesive on one surface, in a manner that they may be readily peeled from the backing strip 21 and assembled to the rod in the described manner.

As a convenience, the illustrated elongated fabric strips may be provided with a fold line indicia 22 to indicate where the strip should be folded in assemblying the strips to the rod 10.

What has been described is a unique survey marker which is convenient to use and has a number of advantages over more conventional marker stakes such as wood laths. This disclosed marker is particularly convenient for the user when marketed in kit form and made up in the field. These markers are particularly desirable for use in cold weather areas, where the flags may be conveniently assembled or otherwise made up in warm enclosures and, because of their minimum bulk, easily transported to and driven into the ground at the desired locations. For use in kit form, the written indicia may be readily placed on the pliant sheets while on the roll, prior to being removed from the carrier tape 21. It will be apparent that a substantial number of stakes, in the above described kit form, can be carried in a field vehicle for example, that is a supply of rods 10, fabric strip rolls 21 and rolls of ribbon 30, so that desired markers can be assembled and provided with the desired written indicia even within the confined space of a service vehicle with relief from severe weather conditions.

While preferred embodiments of the invention have been illustrated and described, it will be understood by those skilled in the art that changes and modifications may be resorted to without departing from the spirit and scope of the invention.

What is claimed is:

1. A survey marker comprising, in combination a stake comprising an elongated small-gauge metal rod, having a sufficient stiffness to be driven into the ground;

an indicia member comprising a laminate of two pliant sheets, each sheet initially having an adhesive coating on one face, with its other face adapted to receive written indicia;

said pliant sheets being bonded to each other and to said rod, adjacent to one end of said rod, by means of said adhesive coatings; said rod being disposed between said bonded sheets, generally centrally of opposite edges thereof;

an elongated ribbon secured to said indicia member, having a portion passing transversely between said laminated sheets and secured by means of the adhesive thereon; and said ribbon extending for a substantial length in at least one direction from the edge of said indicia member;

and said laminated indicia member providing a relatively firm surface capable of receiving written indicia.

2. A survey marker as set forth in claim 1 said adhesive coatings for said pliant sheets comprising pressure sensitive adhesive coatings.

3. A survey marker as set forth in claim 1 said indicia member comprising a single elongated pliant sheet symmetrical about a transverse fold line, with the portions of said sheet on opposite sides of said fold line being folded on each other to define said two laminated sheets;

said single elongated sheet being folded over one end of said rod and bonded to itself and to said rod, with said fold line being transverse to said rod;

said elongated ribbon having its central portion disposed between said laminated sheets adjacent to and parallel to said fold line, and secured to the adhesive faces thereof; the ends of said ribbon extending for a substantial length beyond the edges of said indicia marker.

4. A survey marker comprising, in combination a stake comprising an elongated small-gauge metal rod, having a sufficient stiffness to be driven into the ground;

an indicia member comprising a single elongated pliant sheet initially having an adhesive coating on one face, with its other face adapted to receive written indicia; said pliant sheet being symmetrical about a transverse fold line, with the portions of said sheet on opposite sides of said fold line being folded on each other to define two laminated sheets;

said single elongated sheet being symmetrical about a longitudinal axis and a transverse axis; said central fold line being identified by indicia on said strip at said transverse axis; and said elongated sheet, in assembled relation with said rod, being folded over one end of said rod and bonded to itself and to said rod; having its longitudinal axis coinciding generally with the axis of said rod, and having its transverse axis coinciding generally with said one end of said rod;

and said laminated indicia member providing a relatively firm surface capable of receiving written indicia.

5. A survey marker as set forth in claim 4 said pliant sheet of said indicia member being fabricated from pliant film of a plastic material.

6. A survey marker as set forth in claim 4 said indicia member providing a surface on one side of at least about 2 inches by 3 inches.

7. A method for fabricating a survey marker including the steps fabricating a stake from a suitable length of small gauge metal rod which has a sufficient thickness to be driven into the ground;

fabricating an indicia member from two pliant sheets each having an adhesive coating on one face positioning the adhesive faces of said sheets in confronting bonding relation to each other, with one end of said rod disposed between said sheets and between opposite edges thereof; and bonding said pliant sheets to each other and to said rod by means of said adhesive coating, thereby forming a laminated indicia member with a relatively firm surface capable of receiving written indicia;

positioning a small linear portion of an elongated narrow ribbon between said pliant sheets prior to the bonding of said sheets together, whereby said ribbon is secured between the sheets of said indicia member by said adhesive coatings, and extends from at least one edge of said indicia member.

8. A method as set forth in claim 7 wherein the steps of fabricating and positioning said two pliant sheets are accomplished by fabricating a single elongated pliant sheet, and folding said sheet on itself and over said one end of said rod to provide said laminated indicia member.

* * * * *